US007402799B2

(12) United States Patent
Freidhoff

(10) Patent No.: US 7,402,799 B2
(45) Date of Patent: Jul. 22, 2008

(54) MEMS MASS SPECTROMETER

(75) Inventor: Carl B. Freidhoff, New Freedom, PA (US)

(73) Assignee: Northrop Grumman Corporation, Los Angeles, CA (US)

( * ) Notice: Subject to any disclaimer, the term of this patent is extended or adjusted under 35 U.S.C. 154(b) by 244 days.

(21) Appl. No.: 11/260,106

(22) Filed: Oct. 28, 2005

(65) Prior Publication Data

US 2007/0096023 A1 May 3, 2007

(51) Int. Cl.
*H01J 49/28* (2006.01)
*B01D 59/44* (2006.01)

(52) U.S. Cl. ....................... 250/294; 250/281; 250/282; 250/296; 250/299; 250/397; 438/456

(58) Field of Classification Search .................. 250/294
See application file for complete search history.

(56) References Cited

U.S. PATENT DOCUMENTS

| | | | | | |
|---|---|---|---|---|---|
| 3,849,656 | A | * | 11/1974 | Wallington | 250/424 |
| 4,019,989 | A | * | 4/1977 | Hazewindus et al. | 250/396 ML |
| 4,166,952 | A | * | 9/1979 | Colby et al. | 250/288 |
| 4,472,631 | A | * | 9/1984 | Enke et al. | 250/281 |
| 4,851,700 | A | * | 7/1989 | Goodley | 250/288 |
| 4,894,549 | A | * | 1/1990 | Stengl | 250/492.2 |
| 4,912,327 | A | * | 3/1990 | Waugh | 250/309 |
| 5,118,939 | A | * | 6/1992 | Ishihara | 250/299 |
| 5,202,561 | A | * | 4/1993 | Giessmann et al. | 250/281 |
| 5,245,192 | A | * | 9/1993 | Houseman | 250/423 R |
| 5,386,115 | A | * | 1/1995 | Freidhoff et al. | 250/281 |
| 5,401,963 | A | | 3/1995 | Sittler | |
| 5,466,932 | A | | 11/1995 | Young et al. | |
| 5,492,867 | A | * | 2/1996 | Kotvas et al. | 438/3 |
| 5,530,244 | A | * | 6/1996 | Sriram et al. | 250/281 |
| 5,536,939 | A | * | 7/1996 | Freidhoff et al. | 250/281 |
| 5,541,408 | A | | 7/1996 | Sittler | |
| 5,621,209 | A | * | 4/1997 | Purser | 250/296 |
| 5,659,171 | A | * | 8/1997 | Young et al. | 250/289 |
| 5,747,815 | A | * | 5/1998 | Young et al. | 250/423 R |
| 6,072,182 | A | * | 6/2000 | Chutjian et al. | 250/427 |
| 6,191,419 | B1 | * | 2/2001 | Sinha | 250/294 |
| 6,452,169 | B1 | * | 9/2002 | Mook | 250/298 |
| 6,717,141 | B1 | * | 4/2004 | Rouse et al. | 250/306 |
| 6,797,963 | B2 | | 9/2004 | Choi et al. | |
| 6,818,911 | B2 | | 11/2004 | Tamamori et al. | |
| 6,900,756 | B2 | * | 5/2005 | Salmon | 342/351 |
| 6,974,957 | B2 | * | 12/2005 | Glukhoy | 250/427 |

(Continued)

OTHER PUBLICATIONS

B.A. Olshausen, “Aliasing”, http://redwood.berkeley.edu/bruno/npb261/aliasing.pdf.*

(Continued)

*Primary Examiner*—David A. Vanore
*Assistant Examiner*—Bernard Souw
(74) *Attorney, Agent, or Firm*—Andrews Kurth LLP

(57) ABSTRACT

A MEMS mass spectrometer having metal walls connected between a lid and base, with the walls defining a plurality of interior chambers including sample gas input chambers, an ionizer chamber, a plurality of ion optics chambers and a ion separation chamber. A detector array at the end of the ion separation chamber includes a plurality of V-shaped detector elements positioned along two parallel lines and arranged to intercept all of the ionized beams produced in the mass spectrometer.

17 Claims, 12 Drawing Sheets

U.S. PATENT DOCUMENTS

| | | | | |
|---|---|---|---|---|
| 7,066,023 | B2 * | 6/2006 | Herzen et al. | 730/304 R |
| 7,208,729 | B2 * | 4/2007 | Syms | 250/288 |
| 7,235,098 | B2 * | 6/2007 | Palmaz | 623/1.15 |
| 2004/0124350 | A1 * | 7/2004 | Miller et al. | 250/286 |
| 2005/0177223 | A1 * | 8/2005 | Palmaz | 623/1.15 |
| 2006/0060771 | A1 * | 3/2006 | Grossenbacher et al. | 250/288 |
| 2007/0096023 | A1 * | 5/2007 | Freidhoff | 250/294 |

OTHER PUBLICATIONS

Wikibooks, “Analog and Digital Coversion / Nyquist Sampling Rate” <http://en.wikibooks.org/wiki.Analog and Digital_Conversion/Nyquist_Sampling_Rate>.*

* cited by examiner

MEMS MASS SPECTROMETER

BACKGROUND OF THE INVENTION

1. Field of the Invention

The invention in general relates to the analysis of an unknown gas, and more particularly to a solid state miniature mass spectrometer.

2. Description of Related Art

A mass spectrometer is a device that permits rapid analysis of an unknown gas sample. A small amount of the gas to be analyzed is introduced into the mass spectrometer where it is ionized, focused and accelerated, by means of magnetic and/or electric fields toward a detector array. Different ionized gas constituents travel along different paths to the detector array in accordance with their mass to charge ratios. The outputs from the individual detector elements of the array will then provide an indication of the gas constituents.

Industrial mass spectrometers are generally large, heavy and expensive. Therefore a need exists for a miniature, relatively inexpensive light-weight solid state mass spectrometer for use by the military, homeland security, hazmet crews and industrial concerns, by way of example.

One such miniature solid state mass spectrometer is a MEMS (microelectromechanical system) device described in U.S. Pat. No. 5,386,115. Basically, the described device is comprised of two semiconductor substrates joined together by an epoxy seal. Each half includes intricate cavities formed by a lithographic process. Although the device meets the requirement for small size, due to the depth and intricacy of the cavities, the lithographic process is extremely expensive. Further, under vacuum conditions, the epoxy seal may tend to outgas into the device thus contaminating the readings obtained and limiting its sensitivity.

Accordingly, the mass spectrometer of the present invention is a MEMS device which obviates the drawbacks of the prior art.

SUMMARY OF THE INVENTION

A MEMS mass spectrometer for analyzing an input gas sample comprises a base, a lid spaced from the base, a wall structure including a plurality of metal exterior and interior walls extending between the lid and base. The exterior walls include side walls and end walls with the interior walls including a plurality of walls connected to the side walls, and a plurality of walls connecting an end wall with a first of the interior walls.

The exterior and interior walls define a plurality of interior chambers including a plurality of sample gas input chambers, an ionizer chamber, at least one ion optics chamber and an ion separation chamber. The arrangement additionally includes a repeller and first and second spaced apart E-field electrodes disposed in the ion separation chamber. The ion separation chamber includes a detector array having a plurality of detector elements at an end thereof. The repeller, ionizer chamber, at least one ion optics chamber and the E-field electrodes are operable to generate and project a plurality of ionized beams directed toward the detector array. The detector elements provide respective output signals indicative of the constituency of the gas sample in response to impingement of the ionized beams.

Further scope of applicability of the present invention will become apparent from the detailed description provided hereinafter. It should be understood, however, that the detailed description and specific example, while disclosing the preferred embodiment of the invention, is provided by way of illustration only, since various changes and modifications within the spirit and scope of the invention will become apparent to those skilled in the art, from the detailed description.

BRIEF DESCRIPTION OF THE DRAWINGS

The present invention will become more fully understood from the detailed description provided hereinafter and the accompanying drawings, which are not necessarily to scale, and are given by way of illustration only, and wherein.

DESCRIPTION OF THE PREFERRED EMBODIMENT

Figure 1:
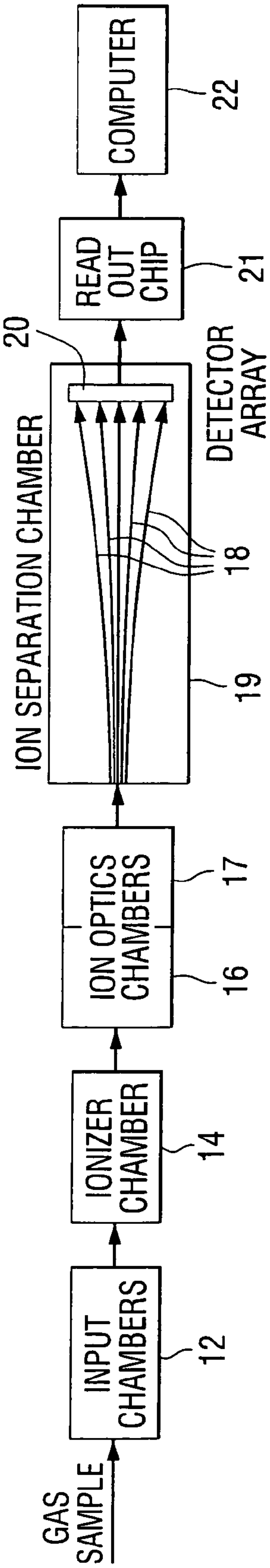
FIG. 1 is a block diagram of the mass spectrometer of the present invention.

Referring now to FIG. 1, there is illustrated a block diagram of a mass spectrometer in accordance with the present invention. The mass spectrometer 10 includes a plurality of input chambers 12 for receiving an unknown gas sample and for initially reducing the pressure within the mass spectrometer. Gas then enters an ionizer chamber 14 where the gas sample is ionized and is then subject to a focusing action in at least one ion optics chamber. In a preferred embodiment first and second ion optics chambers 16 and 17 are utilized. Ionized beams 18 pass through the ion separation chamber 19 and strike a detector array 20 comprised of a plurality of individual detector elements. The outputs of the detector elements are then coupled to a readout chip 21 which can convert the analog detector element signals to digital form and provide them to a computer 22 which will provide an indication of the unknown gas sample.

Figure 2:
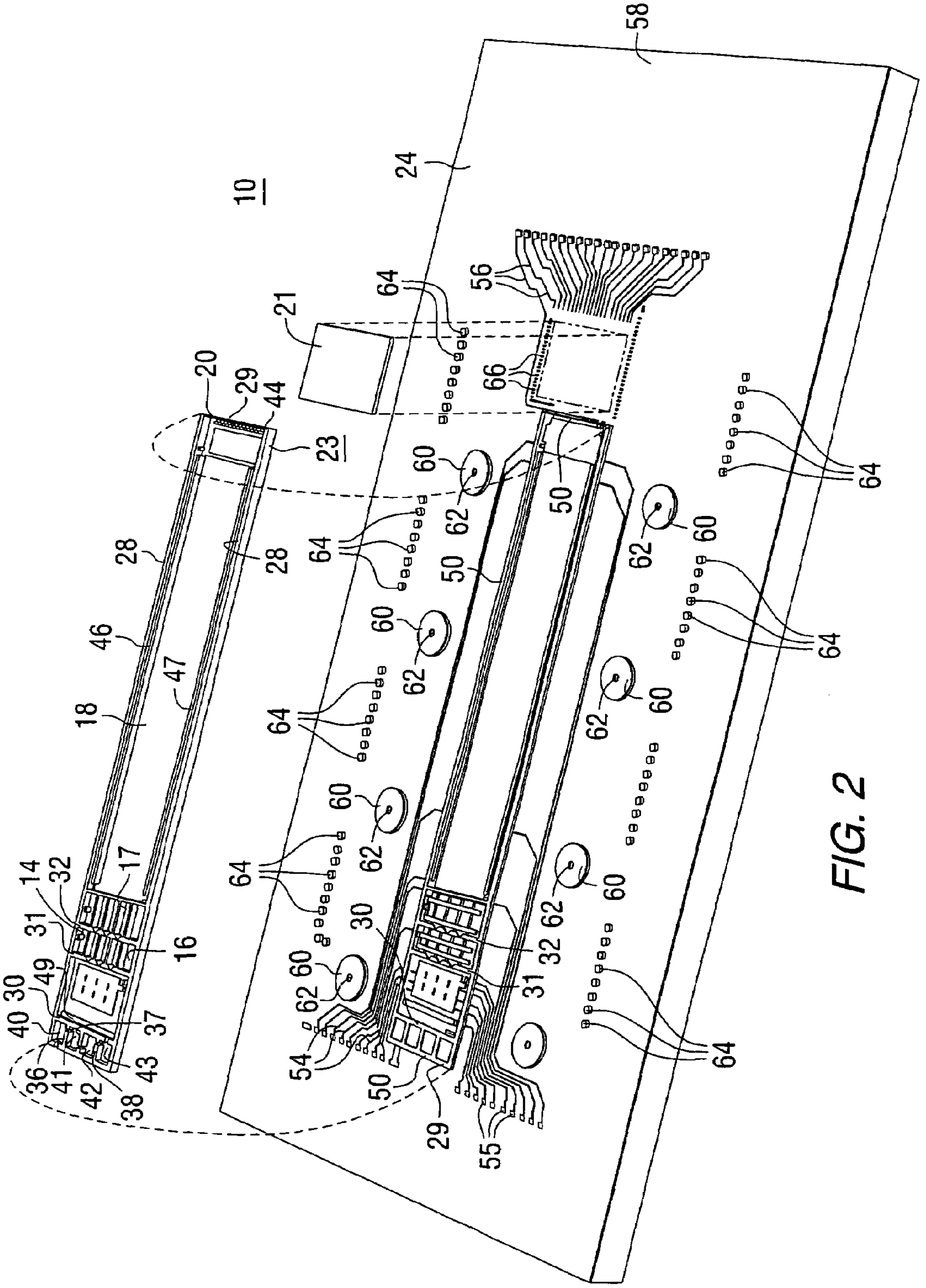
FIG. 2 is an exploded view of two halves, the lid and the base, of the mass spectrometer.

As illustrated in the exploded view of FIG. 2, the mass spectrometer 10 is comprised of a lid 23 and a base 24. Extending from the underside of lid 23 is a wall structure which includes longitudinally extending side walls 28, end walls 29, and a plurality of transverse interior walls 30, 31 and 32 extending between side walls 28. A plurality of short walls 36, 37 and 38 define, with wall 30, a plurality of input chambers 40, 41, 42 and 43. In addition, detector elements of the detector array 20 also extend from the underside of lid 23.

Sample gas from the last of the input chambers 43 goes into the ionizer chamber 14, then into the ion optics chambers 16 and 17 and into the ion separation chamber 19 where ion beams 18 (FIG. 1) are directed to the detector elements of the detector array 20. E-field electrodes 46 and 47 are also carried by the lid 23, as is a repeller 49. As will be seen, various posts are also provided for electrical conduction between leads on the base 24 and elements on the lid 23.

The members extending from the lid 23 may be formed by the well-known LIGA process (LIGA being an acronym for the German name Lithographie, Galvanoformung, Abformung). Basically, prior to the LIGA process, the underside of lid 23 is coated with an insulating layer 44, such as $SiO_2$ (silicon dioxide) and various areas of gold are deposited on the $SiO_2$ for subsequent connection to the walls and other elements extending between the lid 23 and base 24.

Also, various thin film components are deposited, as will be subsequently described with respect to FIGS. 5A and 5B. In the LIGA process a thick layer of photoresist is applied to the underside of lid 23 and is covered by a mask containing the desired wall etc. patterns. A lithography process, such as X-ray lithography is applied forming deep depressions in the resist which are subsequently plated with a metal such as gold or an alloy of gold. The lid structure illustrated in FIG. 2 results when the resist is removed. With this process, walls as high as 1 mm may be formed. The ability to fabricate the mass spectrometer with walls potentially as high as 1 mm allows for higher detector elements to be used, thus increasing the sensitivity of the device.

In joining the lid 23 to the base 24, an epoxy, with its potential for outgassing and signal contamination, is not used. Rather, the lid 23 is soldered to the base 24 with appropriate heat and pressure, in a fluxless atmosphere, forming a vacuum tight seal. For this purpose the base is provided with a solder pattern 50 which is identical to the wall, E-field electrode, repeller and detector element layout of the lid 23.

The base 24 includes three groups of electrical leads 54, 55 and 56, along with solder bumps 60 surrounding apertures 62 for gas communication with individual pumps, the electrical power to which are made via connections 64. Solder bumps 66 receive the detection array read out chip 21. Prior to the various depositions, the base is given an initial preparation, as illustrated in FIG. 3.

Figure 3:
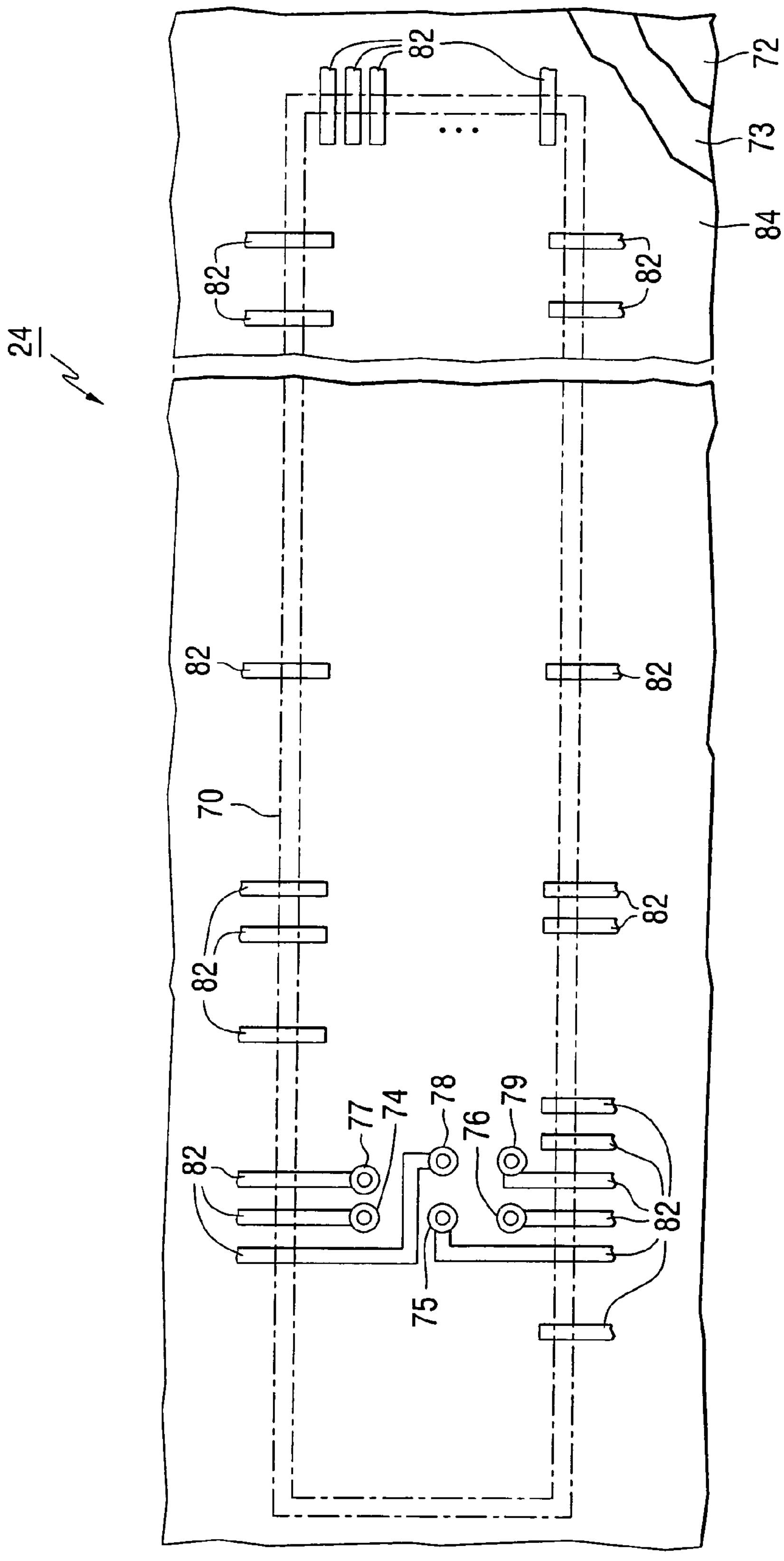
FIG. 3 is a plan view of the base illustrating the initial preparation required.

In the plan view of a portion of the base 24 in FIG. 3, numeral 70 represents the footprint of the outside wall structure when the lid 23 and base 24 are joined. In one embodiment the surface 72 of base 24 is covered with a first insulating layer 73 such as $SiO_2$. Base 24 may be of a p-type semiconductor and at least one n-type semiconductor ionizer is fabricated in the base. However, in a preferred embodiment, for added life, a plurality of such ionizers are provided, six, 74 to 79, being illustrated by way of example. That is, after the useful life of one ionizer, a subsequent ionizer may be placed into operation.

A series of short individual electrical leads 82 are deposited for connecting leads 54, 55 and 56 (FIG. 2) with interior components after the lid 23 and base 24 are joined. Such leads 82 will pass under the walls and will be insulated therefrom by a second $SiO_2$ layer 84 deposited over leads 82 and which $SiO_2$ layer 84 is provided with vias to make electrical contact between leads 54, 55 and 56 and appropriate leads 82. After the second layer 84 of $SiO_2$ is deposited, it is given a chemical mechanical polishing to smooth its surface and, as will be shown, a polysilicon resistive film is applied in the area between where the E-field electrodes will be located, as well as to form a gate (not illustrated in FIG. 3) for the ionizers 74 to 79.

Figure 4A:
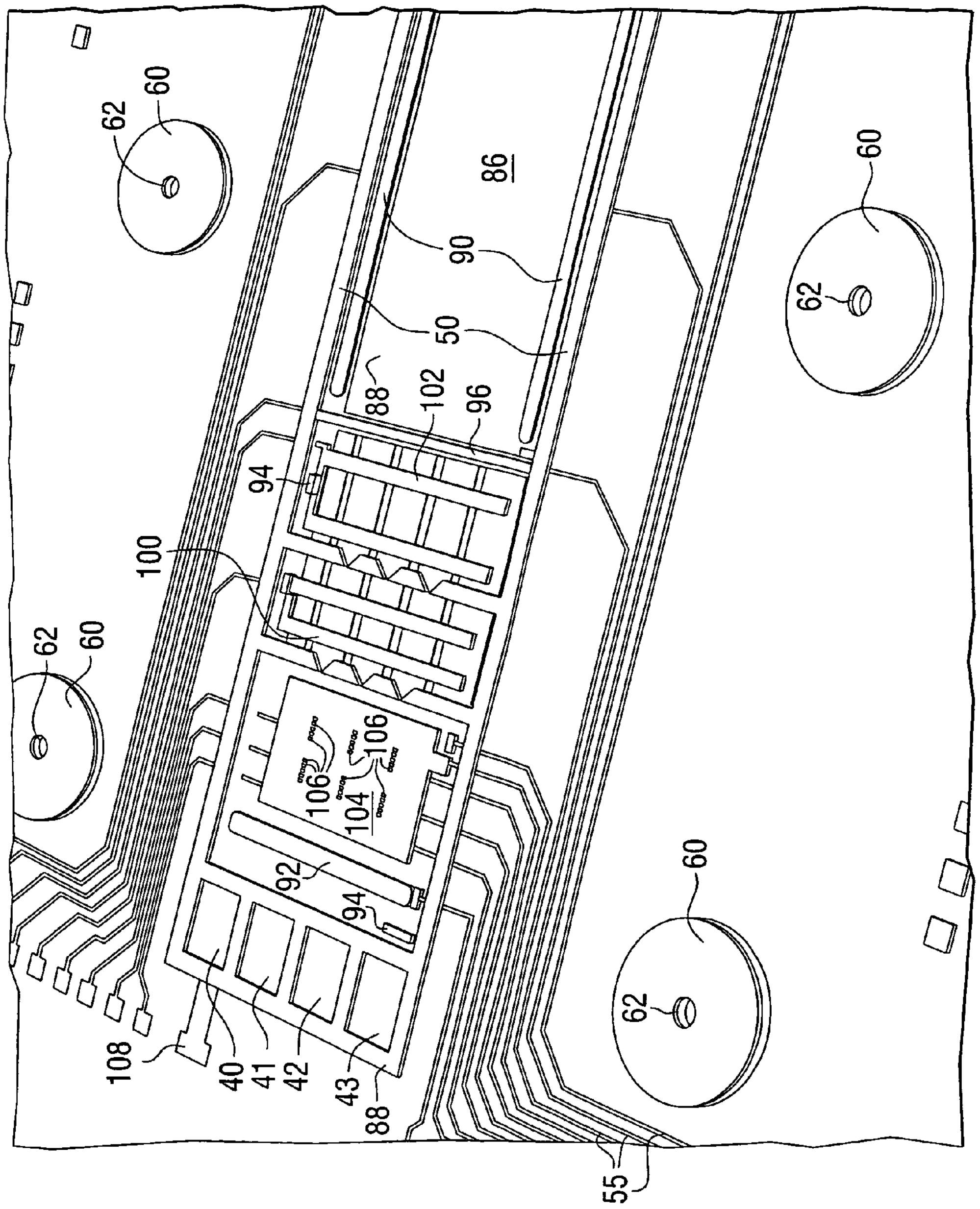
FIGS. 4A and 4B are respective views of the front and back portions of the base, after application of certain elements.
Figure 4B:
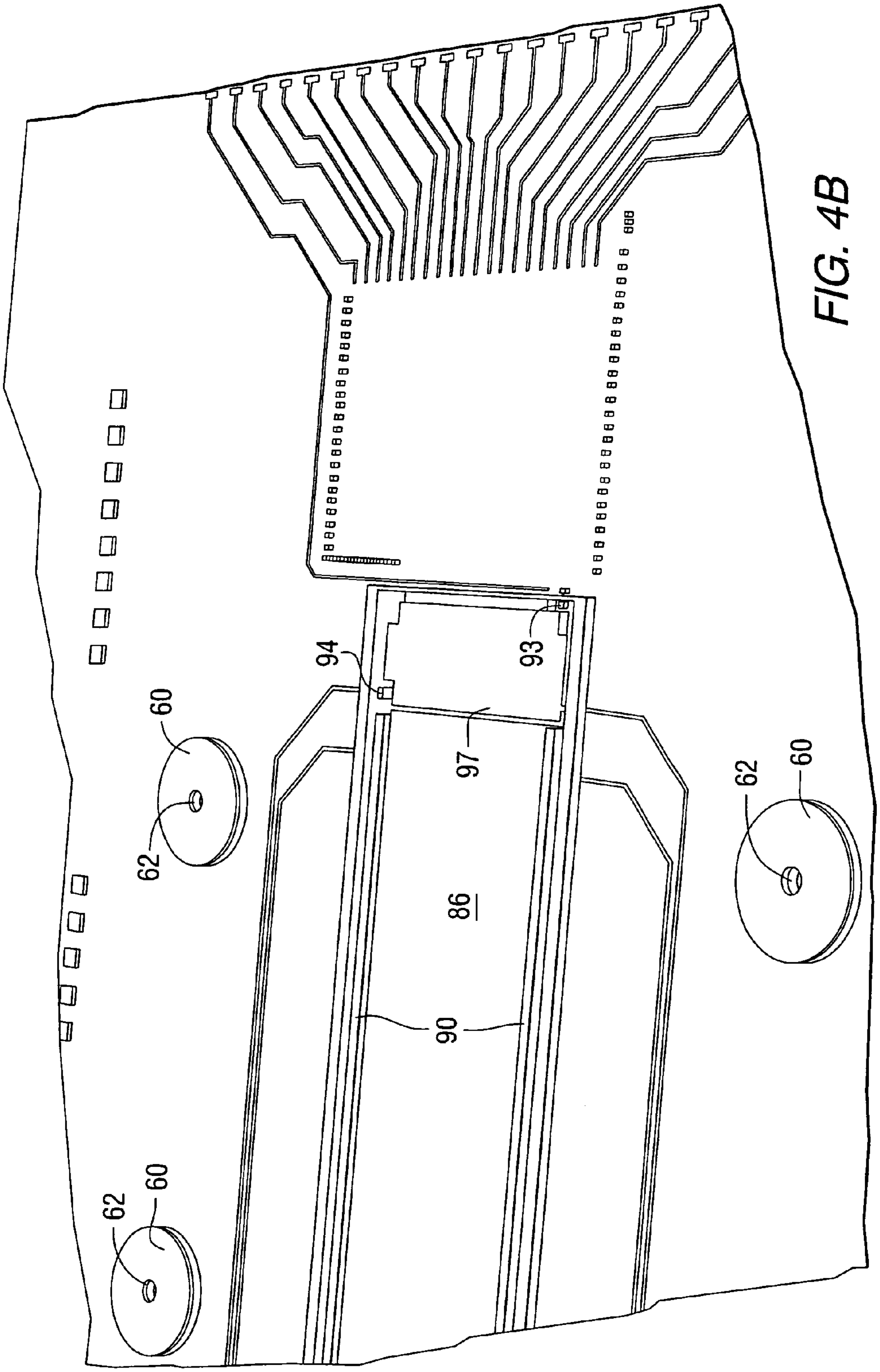

A more detailed view of the front and back ends of base 24 is respectively illustrated in FIGS. 4A and 4B. After the initial preparation, as illustrated in FIG. 3, a thin layer of metal, preferably gold, is deposited in various locations. For example, in order for the solder pattern 50 to better adhere to the base 24, a thin layer of gold 88 is deposited in the same pattern as the solder pattern 50, and on which the solder pattern 50 is deposited. The same is true for the E-field electrode solder 90, repeller solder 92, detector element solder 93 as well as various posts 94 by which electrical connection will be made with various elements on the lid.

Gold is also deposited to form a film 96 defining a base electrode of a first deflector and to form a film 97 defining a base electrode of a second deflector, just prior to the location of the detector array 20. Gold is also deposited for: the pattern of electrical leads 54, 55 and 56 for connection to respective short leads 82; pump contacts 64; readout chip solder bumps 66; as well as base electrodes 100 and 102 of an ion optics arrangement for respective ion optics chambers 16 and 17. A gold coating is also applied to gate 104 of ionizer chamber 14. Gate 104 functions to accelerate the electrons produced by the underlying semiconductor ionizers and includes a plurality of apertures 106 to allow escape of electrons to ionize the sample gas.

After the deposition of pump solder bumps 60, apertures 62 may be formed such as by laser drilling or reactive ion etching. Gas is supplied to the first input chamber 40 by means of an input connection, as will be described. A tab 108 will be electrically connected to the wall structure in order to monitor its electrical potential A more detailed view of the front and back ends of lid 23 is respectively illustrated in FIGS. 5A and 5B. Slits 110, 111 and 112 in respective short walls 36, 37 and 38 allow the sample gas to pass from the first input chamber 40 to the last input chamber 43, and slit 113 permits passage into the ionizer chamber 14.

A collector electrode 116 within the ionizer chamber 14 and formed on $SiO_2$ layer 44 prior to the LIGA process serves to collect the electrons accelerated by gate 104 (FIG. 4A), while repeller 49 functions to accelerate the ionized gas into the subsequent ion optics chamber 16.

Lid electrodes 118 and 120, also formed prior to the LIGA process, are disposed in the ion optics chambers 16 and 17 and are positioned on the lid 23 opposite their counterpart electrodes 100 and 102 on base 24 to control the ionized beam in the vertical direction. In the present invention the ionized beams are also controlled in the horizontal direction by virtue of longitudinally extending segmented walls 124 to 127 in ion optics chamber 16 and 128 to 131 in ion optics chamber 17.

Figure 5A:
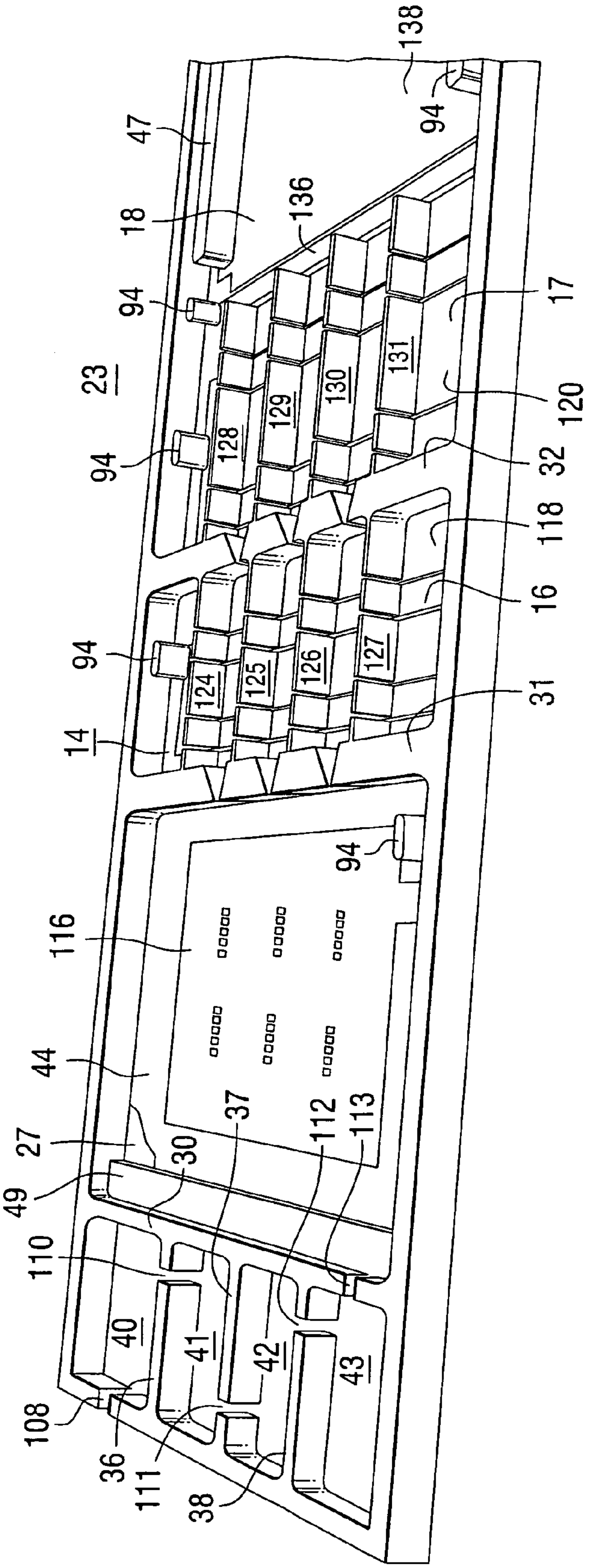
FIGS. 5A and 5B are respective views of the front and back portions of the lid, after application of certain elements.
Figure 5B:
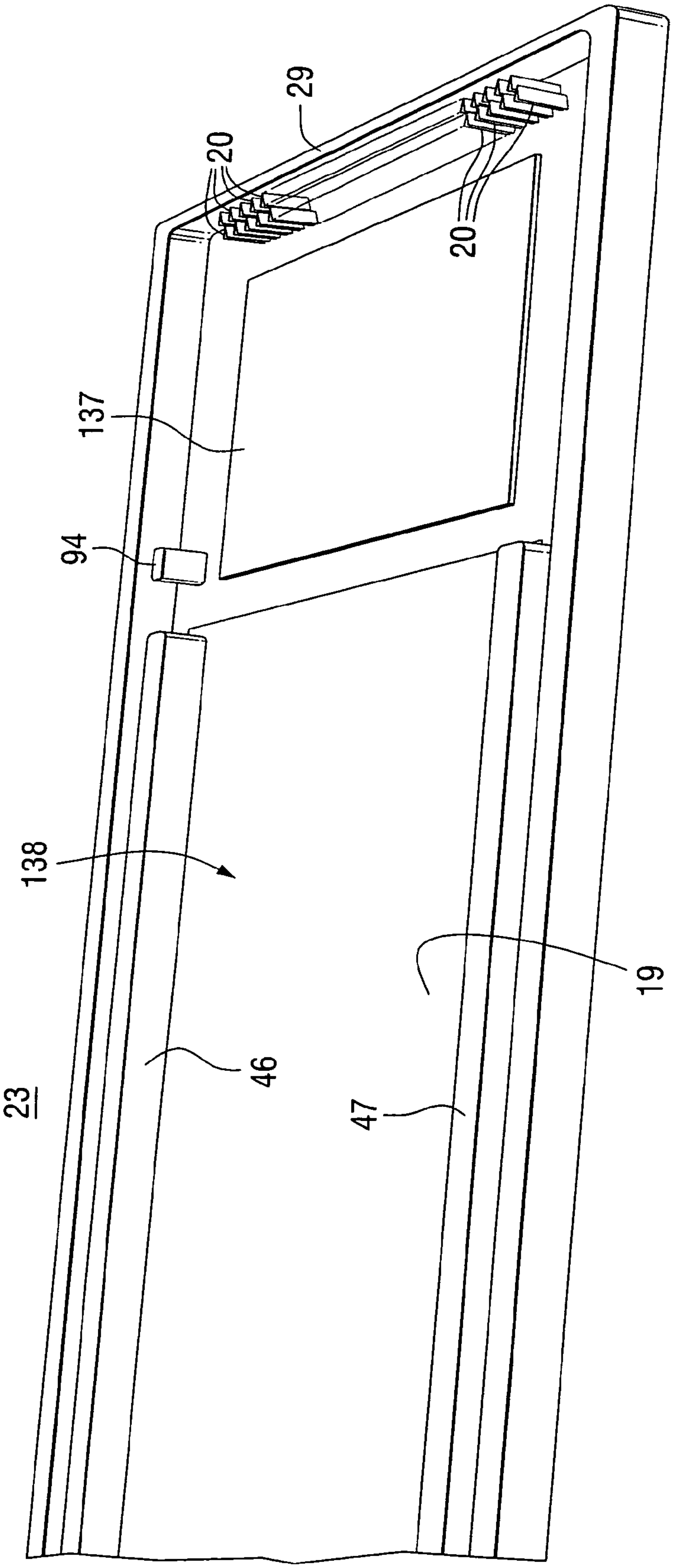

Electrodes 136 and 137 are positioned opposite respective electrodes 96 and 97 on the base for vertical control and FIGS. 5A and 5B also illustrate the E-field electrodes 46 and 47 for horizontal control. A polysilicon resistive film 138 is positioned on the lid 23 between E-field electrodes 46 and 47 opposite its counterpart resistive film 86 on the base 24. These resistive films 86 and 134 provide for a more uniform electric field produced by the E-field electrodes 46 and 47. Positioned near end wall 29 in FIG. 4B is the detector array 20.

Figure 6:
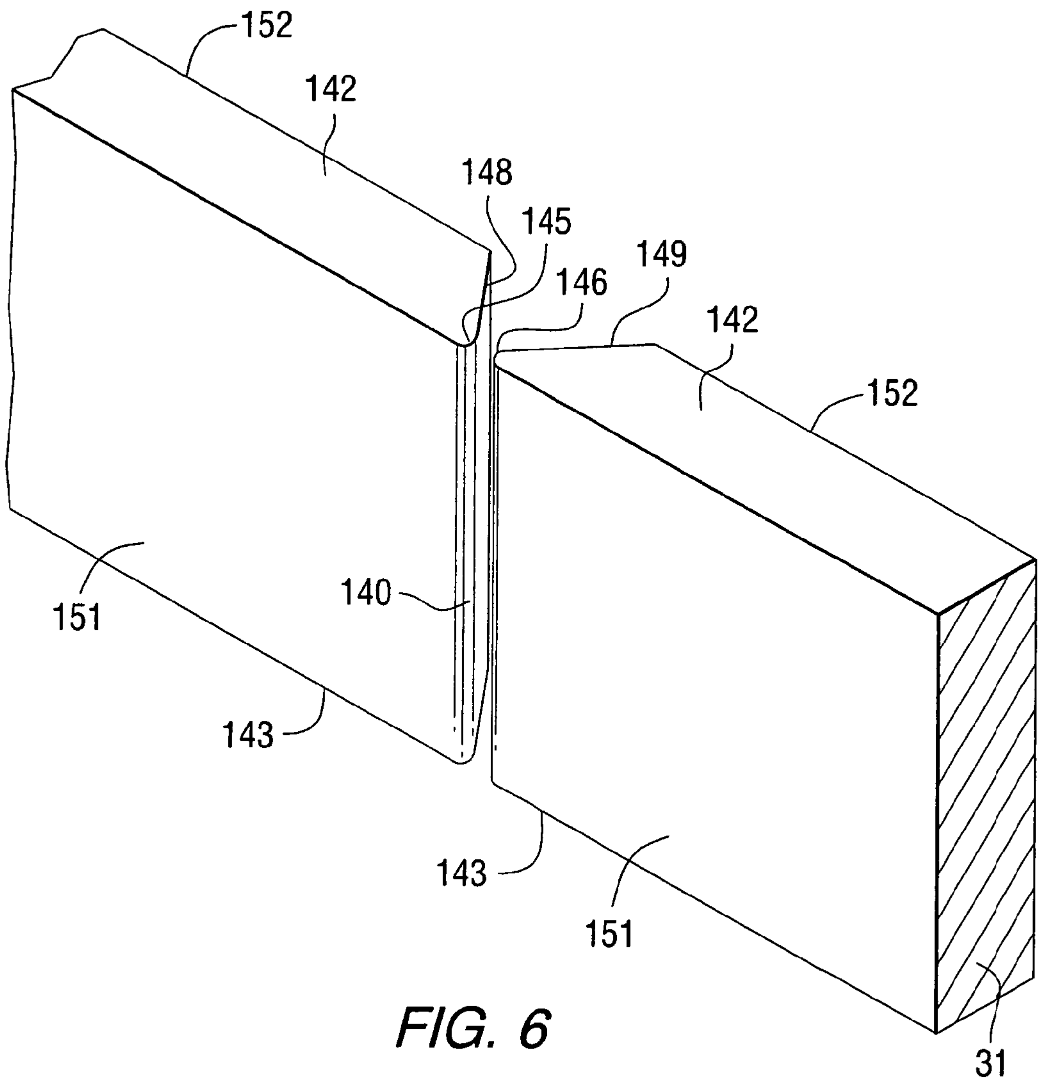
FIG. 6 is a view of a portion of a wall in an ion optics chamber of the mass spectrometer.

Interior walls 31 and 32, positioned at the beginning of respective ion optics chambers 16 and 17, are of a unique design that allows for greater gas and ion beam flow with less resistance than comparable walls in prior art devices. A detail of a portion of one of the walls, 31 is illustrated in FIG. 6. Each wall, such as wall 31, includes three slits of which one, slit 140, is illustrated. Slit 140 extends the entire height of the wall from the top 142 to the bottom 143 thus allowing for a large flow of sample gas. Each rounded edge 145 and 146 has a respective side wall tapering section 148 and 149 which tapers from front 151 to back 152 of wall 31 and is at an acute angle with respect to the front 151. This tapering design significantly reduces the wall friction presented to the flowing gas and ion beam sample.

Figure 7:
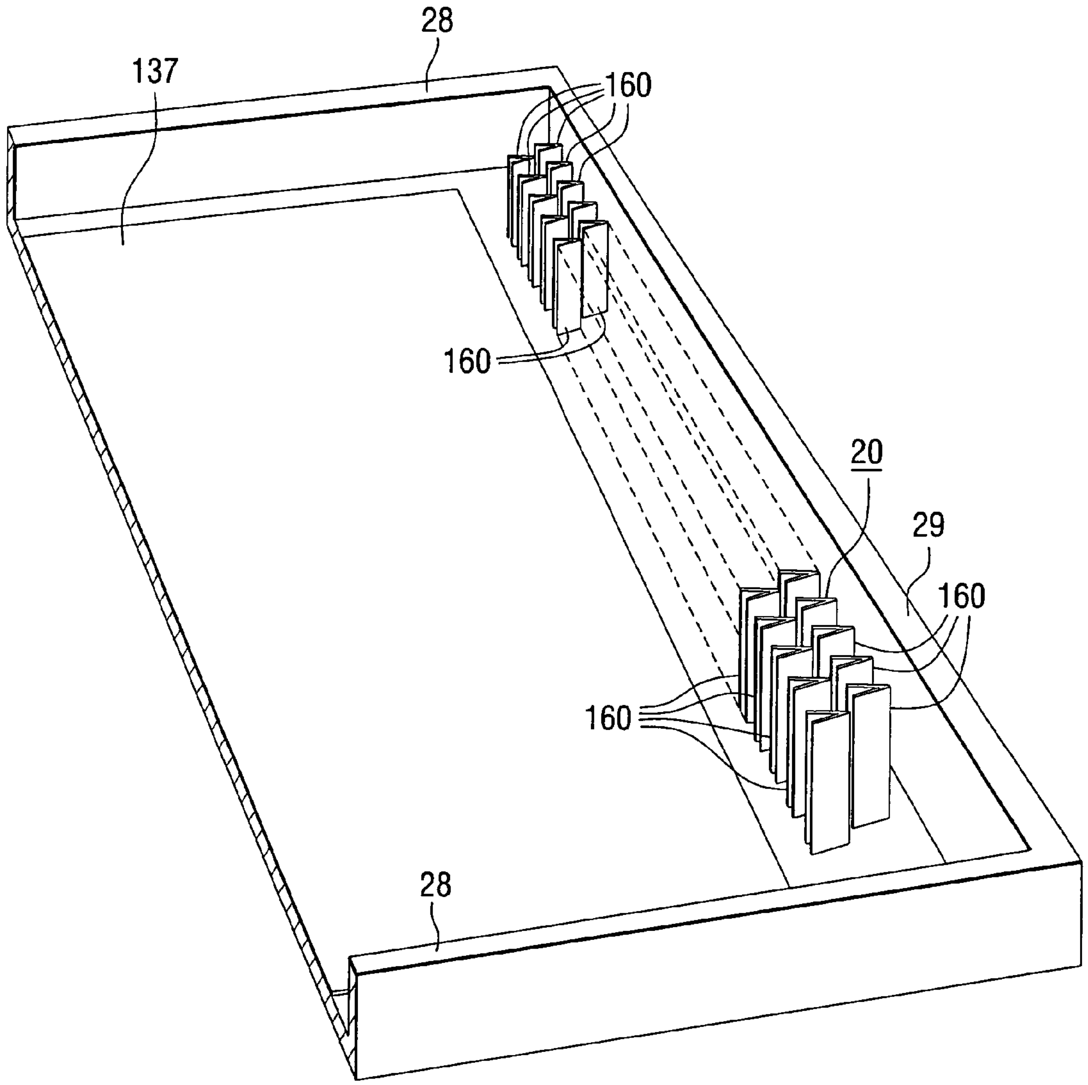
FIG. 7 illustrates a close up view of the detector elements of a detector array.

As illustrated in FIG. 7, the detector array 20 is comprised of a plurality of individual detector elements 160 which extend from the lid 23 to the base 24 of the mass spectrometer. In a preferred embodiment each detector element 160 is V-shaped with the open portion of the V facing the impinging ion beams. A typical mass spectrometer may have, by way of example, 64 such detector elements 160, each of which will provide an individual output signal to the detector read out chip 21 (FIG. 2).

Figure 8:
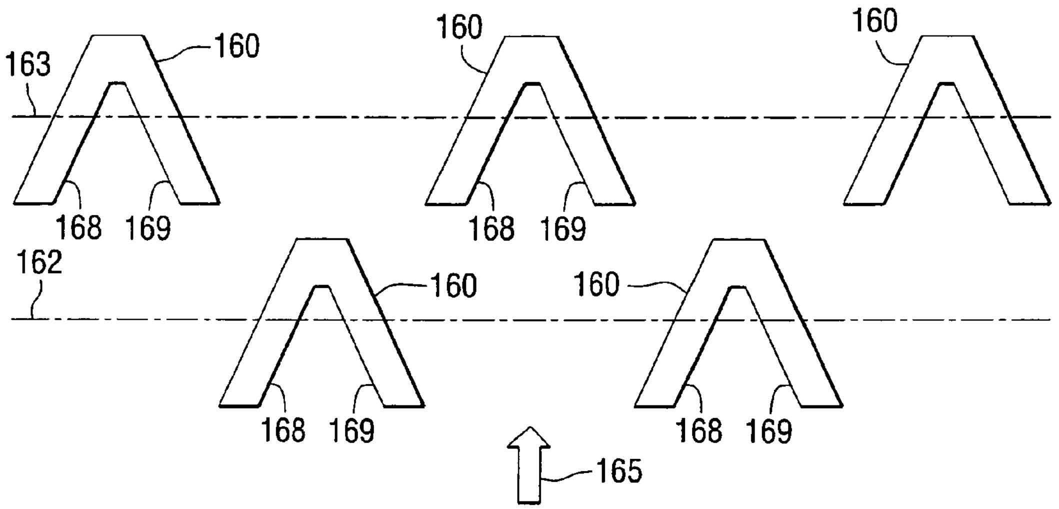
FIG. 8 is a plan view of several detector elements.

A plan view of several detector elements 160 is illustrated in FIG. 8. Half of the detector elements 160 are disposed along a line 162 and the other half along line 163, displaced from line 162 in the longitudinal direction in which the ion beams travel, indicated by arrow 165 and is parallel to line 162. This arrangement significantly reduces parasitic capacitance by separating sequential detector elements 160, which if arranged along a single line, would be touching, or almost touching.

In addition, the staggered arrangement ensures that substantially 100% of the ion beams are detected since there is no gap between sequential detector elements 160. The preferred V-shape of a detector element 160 defines first and second angled walls 168 and 169 which allow a beam to bounce back and forth between the walls 168 and 169. The more collisions a beam has with a detector element 160, the higher the probability that more of the ion beam charge will be transferred to the detector element 160, thus providing for higher sensitivity.

Figure 9A:
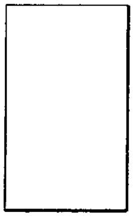
FIGS. 9A to 9 C illustrate alternate forms of detector elements.
Figure 9B:
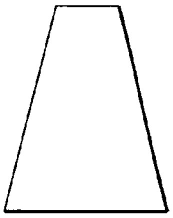
Figure 9C:
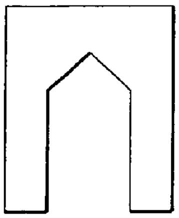

Although the V-shaped detector element 160 is preferred, other shapes may also be used. For example, FIG. 9A illustrates a solid rectangular detector element, FIG. 9B a solid trapezoidal detector element and FIG. 9C a detector element having initial parallel walls which transition into a V-shape.

Figure 10:
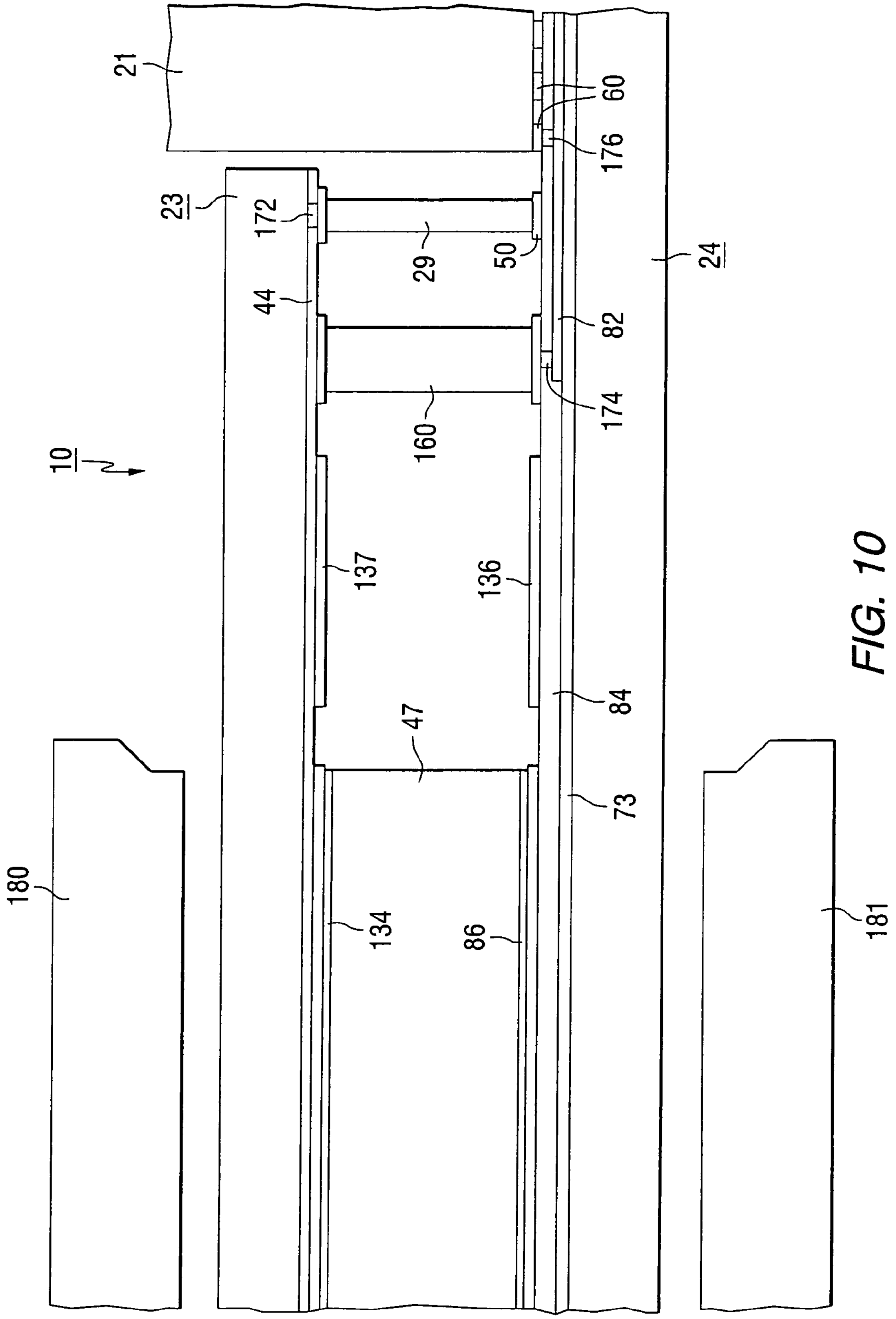
FIG. 10 is a cross sectional view of a portion of the mass spectrometer.
Figure 11:
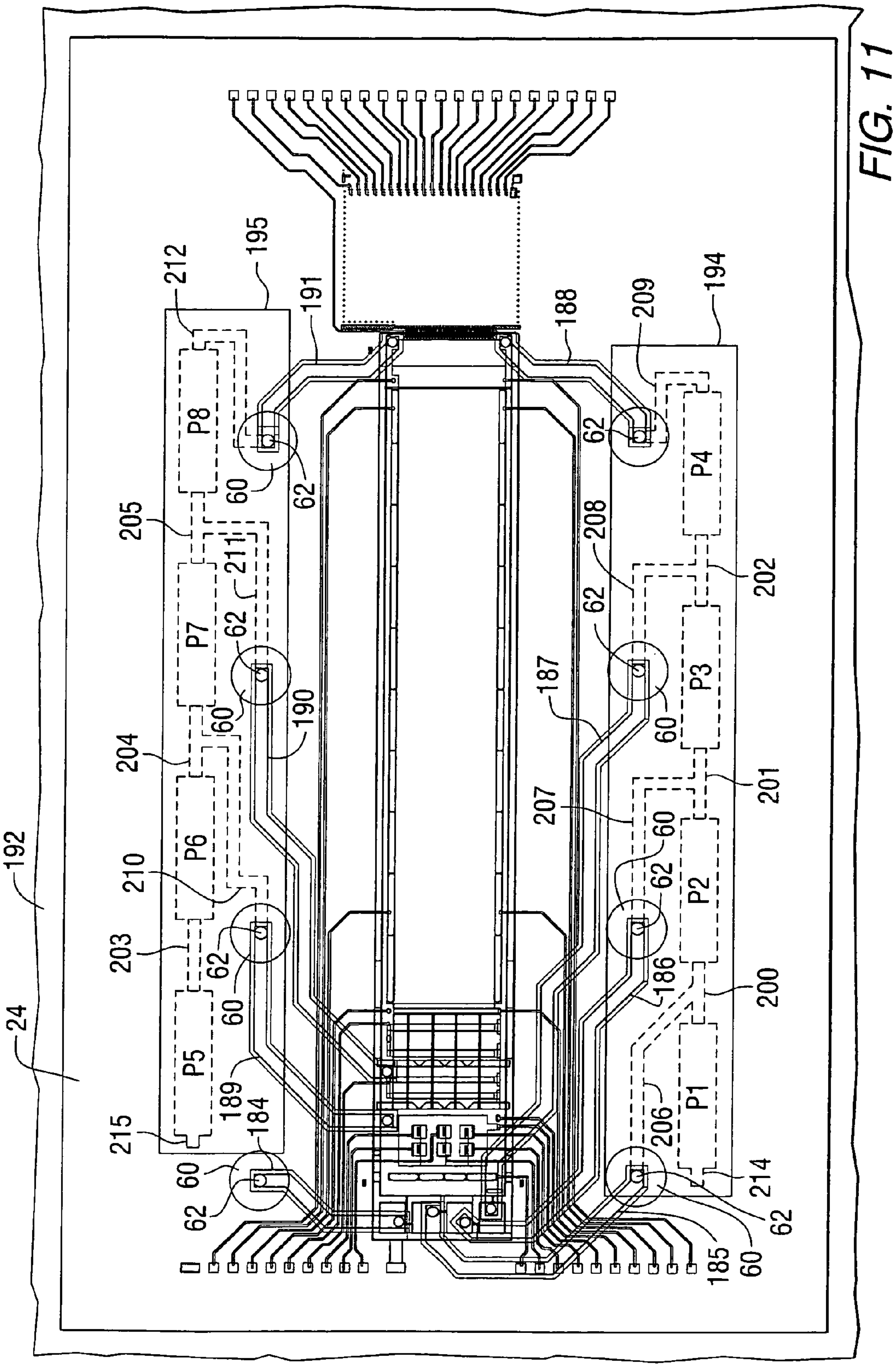
FIG. 11 is a schematic presentation of a differential pump arrangement for evacuating the chambers of the mass spectrometer.

FIG. 10 is a longitudinal cross sectional view of the mass spectrometer at the back end. In order to prevent the lid substrate 23 from electrically floating, it is electrically connected to the wall structure by means of a metalized via 172 extending through $SiO_2$ layer 44. Other metalized vias illustrated include via 174 for connecting each detector element 160 with a respective lead 82, and via 176 for connecting a lead 82 with a corresponding connection to readout chip 21.

In operation of the mass spectrometer, a magnetic field is provided contiguous and orthogonally oriented with the electric field produced by the E-field electrodes 46 and 47. Although this magnetic field may be generated by an internal magnet, in the embodiment illustrated, the magnetic field is provided by an external magnet having a first pole 180 adjacent lid 23 and a second pole 181 adjacent base 24. The magnetic field, in conjunction with the electric field ensures that the ion beams are fanned out in a more linear direction such that the detector elements 160 may be linearly arranged instead of on a curvilinear line.

In order to reduce the capacity of a single vacuum pump that would be required to evacuate the mass spectrometer to near vacuum conditions in the ion separation chamber 19, a known differential pump arrangement is utilized. FIG. 10 illustrates such an arrangement. Instead of one large capacity pump, a series of small capacity miniature pumps, such as multi-stage membrane pumps P1 to P8, by way of example, may be used. Each such pump is operable to evacuate around 90% of the flow into a chamber and pass on 10% of the flow to a subsequent chamber. In this manner, the pressure is successively reduced from one chamber to the next. This significantly reduces the size of the individual pumps, allowing a small detector to be realized.

Lines 184 to 191 represent gas passageways formed by channels that are etched into the underside of the base 24 and sealed to form the gas passageways by mounting the base to a supporting substrate 192. The mounting of the pumps P1 to P8 may be made in a number of ways. For example in FIG. 10 pumps P1 to P4 are mounted on a substrate, or pump chip, 194 while pumps P5 to P8 are mounted on pump chip 195.

Gas passageways 200 to 205 provide gas communication between pumps, as illustrated, while gas passageways 206 to 211 connect the pump arrangement to the various chambers via apertures 62, as illustrated. These gas passageways 200 to 212 may be etched in the surface of pump chips 194 and 195 and then sealed. The pump chips may then be flipped and joined to the surface of base 24 by solder connection to the plurality of solder bumps 60. The pump system is exhausted to atmosphere via outlets 214 and 215 in respective pumps P1 and P5.

The foregoing detailed description merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A MEMS mass spectrometer for analyzing an input gas sample, comprising:
- a base;
- a lid spaced from said base;
- a wall structure including a plurality of metal exterior and interior walls extending between said lid and said base;
- said exterior walls including side walls and end walls;
- said interior walls including a plurality of walls connected to said side walls, and a plurality of walls connecting one of said end walls with a first of said interior walls;
- said exterior and interior walls defining a plurality of interior chambers including a plurality of sample gas input chambers, an ionizer chamber, at least one ion optics chamber and an ion separation chamber;
- a repeller positioned just prior to said ionizer chamber;
- first and second spaced apart E-field electrodes disposed in said ion separation chamber;
- said ion separation chamber including a detector array having a plurality of detector elements at an end thereof;
- said repeller, ionizer chamber, said at least one ion optics chamber and said E-field electrodes being operable to generate and project a plurality of ionized beams directed toward said detector array;
- said detector elements comprising detecting surfaces positioned vertical to said base and providing respective output signals indicative of the constituency of said gas sample in response to impingement of said ionized beams.

2. Apparatus according to claim 1 wherein:
- said wall structure extends from, and is secured to said lid; and
- said wall structure is solder sealed to said base.

3. Apparatus according to claim 1 which includes:
- first and second ion optics chambers.

4. Apparatus according to claim 1 which includes:
- a plurality of ionizers in said ionizer chamber for placing a subsequent ionizer into operation after the useful life of a previously operating ionizer has been attained.

5. Apparatus according to claim 1 wherein:
- one half of said detector elements are positioned along a first line
- the other half of said detector elements are positioned along a second line, displaced from said first line.

6. Apparatus according to claim 5 wherein:
- said first and second lines are parallel.

7. Apparatus according to claim 5 wherein:
each said detector element is V-shaped with the open portion of said V facing said ionized beams.

8. Apparatus according to claim 5 wherein:
successive ones of said detector elements are staggered and said detector elements are collectively positioned to intercept all of said ionized beams.

9. Apparatus according to claim 1 wherein:
said first of said interior walls includes at least one slit extending from the top of said wall to the bottom of said wall to allow passage of said gas sample.

10. Apparatus according to claim 9 wherein:
said ionizer chamber includes a plurality of individual ionizers; and wherein
said first of said interior walls includes a plurality of said slits which extend from the top of said wall to the bottom of said wall.

11. Apparatus according to claims 9 or 10 wherein:
each said slit includes tapered side walls which are at an acute angle with a front of said wall.

12. Apparatus according to claim 1 which includes:
a first resistive film on said lid connected between said spaced apart E-field electrodes;
a second resistive film on said base connected between said E-field electrodes.

13. Apparatus according to claim 1 wherein:
a first set of electrodes on said lid in said ion optics chamber;
a second set of electrodes on said base in said ion optics chamber;
said first and second sets of electrodes providing for vertical control of ionized gas
at least first and second longitudinally extending walls in said ion optics chamber operatively connected to said first and second sets of electrodes for additionally controlling said ionized gas in a horizontal direction.

14. Apparatus according to claim 1 which includes:
first and second opposed conductive films respectively on said lid and said base positioned at a location just prior to said E-field electrodes for vertical control of said ionized beams.

15. Apparatus according to claim 14 which additionally includes:
third and fourth opposed conductive films respectively on said lid and said base positioned at a location just subsequent to said E-field electrodes for vertical control of said ionized beams.

16. Apparatus according to claim 1 which includes:
a magnet having a first pole contiguous with, and positioned above said E-meld electrodes;
said magnet having a second pole contiguous with, and positioned below said E-field electrodes.

17. Apparatus according to claim 16 wherein:
said magnet is external to said lid and said base.

* * * * *